United States Patent
Hwang et al.

(10) Patent No.: US 10,034,197 B2
(45) Date of Patent: Jul. 24, 2018

(54) METHOD AND APPARATUS FOR PERFORMING CONGESTION MITIGATION AND BARRING

(71) Applicant: Nokia Solutions and Networks Oy, Espoo (FI)

(72) Inventors: Woonhee Hwang, Espoo (FI); Tero Henttonen, Espoo (FI)

(73) Assignee: Nokia Solutions and Netowrks Oy, Espoo (FI)

( * ) Notice: Subject to any disclaimer, the term of this patent is extended or adjusted under 35 U.S.C. 154(b) by 21 days.

(21) Appl. No.: 15/109,748

(22) PCT Filed: Dec. 10, 2014

(86) PCT No.: PCT/EP2014/077107
§ 371 (c)(1),
(2) Date: Jul. 5, 2016

(87) PCT Pub. No.: WO2015/104118
PCT Pub. Date: Jul. 16, 2015

(65) Prior Publication Data
US 2016/0330648 A1  Nov. 10, 2016

Related U.S. Application Data

(60) Provisional application No. 61/925,068, filed on Jan. 8, 2014.

(51) Int. Cl.
*G06F 11/00* (2006.01)
*H04J 3/14* (2006.01)
(Continued)

(52) U.S. Cl.
CPC ......... *H04W 28/0289* (2013.01); *H04W 4/90* (2018.02); *H04W 48/02* (2013.01);
(Continued)

(58) Field of Classification Search
CPC ... H04W 28/0289; H04W 72/10; H04W 4/22; H04W 48/02; H04W 88/02; H04W 28/02
(Continued)

(56) References Cited

U.S. PATENT DOCUMENTS 9,037,137 B2 * 5/2015 Klatt .................... H04W 48/02
370/235
9,661,525 B2 * 5/2017 Rajadurai ......... H04W 28/0289
(Continued)

FOREIGN PATENT DOCUMENTS

WO     2013141600 A1   9/2013
WO     WO2013141600  *  9/2013

OTHER PUBLICATIONS

U.S. Appl. No. 61/898,425, filed Oct. 31, 2013.*
(Continued)

*Primary Examiner* — Chuong T Ho
(74) *Attorney, Agent, or Firm* — Nokia Technologies Oy

(57) ABSTRACT

A method and apparatus may be configured to receive at least one set of barring parameters from a network entity. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network. The method can also include determining whether an application bypasses the barring check associated with the corresponding and lower priority sets of barring parameters.

15 Claims, 11 Drawing Sheets

(51) Int. Cl.
  *H04L 1/00* (2006.01)
  *H04L 12/26* (2006.01)
  *H04W 28/02* (2009.01)
  *H04W 48/02* (2009.01)
  *H04W 72/10* (2009.01)
  *H04W 4/90* (2018.01)
  *H04W 88/02* (2009.01)

(52) U.S. Cl.
  CPC ............ *H04W 72/10* (2013.01); *H04W 28/02* (2013.01); *H04W 88/02* (2013.01)

(58) Field of Classification Search
  USPC .......................................................... 370/237
  See application file for complete search history.

(56) References Cited

U.S. PATENT DOCUMENTS

| | | | |
|---|---|---|---|
| 2013/0045706 A1* | 2/2013 | Hsu ....................... | H04W 4/005 455/404.1 |
| 2015/0036489 A1* | 2/2015 | Rajadurai ......... | H04W 28/0205 370/230 |
| 2015/0119015 A1* | 4/2015 | Gai .................. | H04W 36/0055 455/418 |
| 2015/0119060 A1* | 4/2015 | Aoyagi ................ | H04W 48/02 455/452.1 |
| 2016/0157290 A1* | 6/2016 | Lee ....................... | H04W 48/18 370/329 |
| 2016/0286464 A1* | 9/2016 | Wiemann .............. | H04W 76/27 |

OTHER PUBLICATIONS

International Search Report and Written Opinion received for corresponding Patent Cooperation Treaty Application No. PCT/EP2014/077107, dated Feb. 27, 2015, 5 pages.

Mediatek Inc. "Scope for Smart Congestion Mitigation" 3GPP Draft; R2-133258 DIS Scope for Smart Congestion Mitigation V1, 3rd Generation Partnership Project (3GPP), Mobile Competence Centre; 650, Route Des Lucioles; F-06921 Sophia-Antipolis Cedex/ FR vol. RAN WG2, No. Ljubljana, Slovenia; Oct. 7, 2013-Oct. 11, 2013 Sep. 27, 2013, XP050718955.

3rd Generation Partnership Project; Technical Specification Group Radio Access Network; Evolved Universal Terrestrial Radio Access (E-UTRA); Study on Smart Congestion Mitigation in E-UTRAN, 3GPP Draft; 36848-100, 3rd Generation Partnership Project (3GPP), Mobile Competence Centre; 650, Route Des Lucioles; F-06921 Sophia-Antipolis Cedex; France; Dec. 2, 2013, XP050733397.

3rd Generation Partnership Project; Technical Specification Group Services and System Aspects; Study on Application specific Congestion control for Data Communication, 3GPP Draft; TR22.806 V0.4.0 FS_ACDC_Clean, 3rd Generation Partnership Project 3GPP, Mobile Competence Centre; 650, Route Des Lucioles; F006921 Sophia-Antipolis Cedex; France; Nov. 18, 2013 XP050763914.

* cited by examiner

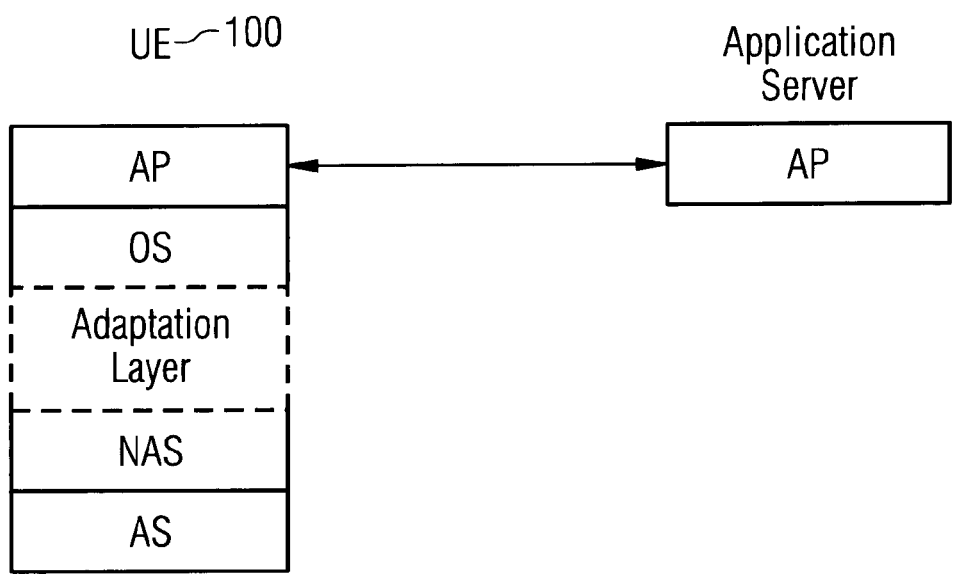

FIG 2

```
SystemInformationBlockType2 ::=     SEQUENCE {
    ac-BarringInfo                  SEQUENCE {
        ac-BarringForEmergency          BOOLEAN,
        ac-BarringForMo-Signalling      AC-BarringConfig        OPTIONAL,   -- Need OP
        ac-BarringForMO-Data            AC-BarringConfig        OPTIONAL,   -- Need OP
    }                                                           OPTIONAL,   -- Need OP
    radioResourceConfigCommon       RadioResourceConfigCommonSIB,
    ue-TimerAndConstants            UE-TimerAndConstants,
    freqInfo                        SEQUENCE {
        ul-CarrierFreq                  ARFCN-ValueEUTRA        OPTIONAL,   -- Need OP
        ul-Bandwidth                    ENUMERATED {n6, n15, n25, n50, n75, n100}
                                                                OPTIONAL,   -- Need OP
        additionalSpectrumEmission      AdditionalSpectrumEmission
    },
    mbsfn-SubframeConfigList        MBSFN-SubframeConfigList    OPTIONAL,   -- Need QR
    timeAlignmentTimerCommon        TimeAlignmentTimer,
    ...,
    lateNonCriticalExtension        OCTET STRING (CONTAINING SystemInformationBlockType2-v8h0-IEs)
                                                                OPTIONAL,   -- Need OP
    [[ ssac-BarringForMMTEL-Voice-r9    AC-BarringConfig        OPTIONAL,   -- Need OP
       ssac-BarringForMMTEL-Video-r9    AC-BarringConfig        OPTIONAL,   -- Need OP
    ]],
    [[ ac-BarringForCSFB-r10            AC-BarringConfig        OPTIONAL    -- Need OP
    ]],
    [[ ac-BarringForGroup1-r12          AC-BarringConfig        OPTIONAL,   -- Need OP
       ac-BarringForGroup2-r12          AC-BarringConfig        OPTIONAL    -- Need OP
    ]]
}
AC-BarringConfig ::=            SEQUENCE {
    ac-BarringFactor                ENUMERATED {
                                        p00, p05, p10, p15, p20, p25, p30, p40,
                                        p50, p60, p70, p75, p80, p85, p90, p95},
    ac-BarringTime                  ENUMERATED {s4, s8, s16, s32, s64, s128, s256, s512},
    ac-BarringForSpecialAC          BIT STRING (SIZE (5))
}
```

FIG 3
```
[[ac-BarringForServiceSpecific-r12      CHOICE {
      ac-BarringForGroup1-R12                AC-BarringConfig,
      ac-BarringForGroup2-r12                AC-BarringConfig
   }
]]
```
FIG 4
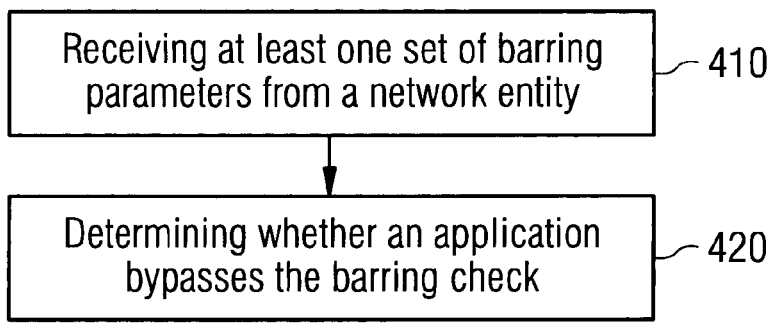
FIG 5
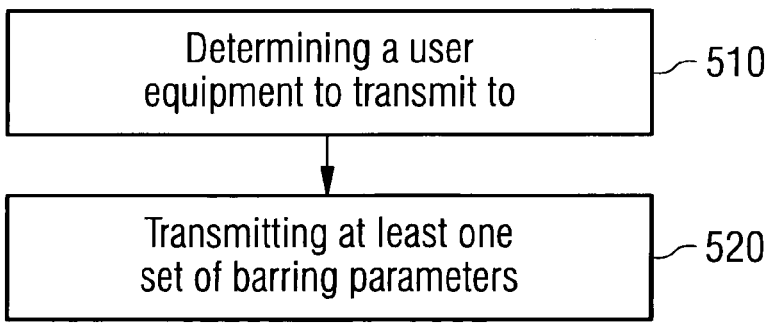

METHOD AND APPARATUS FOR PERFORMING CONGESTION MITIGATION AND BARRING

RELATED APPLICATION

This application was originally filed as Patent Cooperation Treaty Application No. PCT/EP2014/077107 filed Dec. 10, 2014 which claims priority benefit to U.S. Provisional Patent Application No. 61/925,068, filed Jan. 8, 2014.

BACKGROUND

Field

Embodiments of the invention relate to performing congestion mitigation and barring.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

Each user equipment (UE) may belong to an Access Class (AC) (randomly determined according to Subscriber-Identification-Module/Universal-Subscriber-Identity-Module (SIM/USIM)), numbered from 0-9. Additionally, UE may belong to one of special ACs ranging from 11-15. Finally, mobile-originated emergency calls may belong to AC 10. Access Class Barring (ACB) mechanism allows a network to attempt to reduce the access load from mobile originating calls to the network. ACB parameters can also be applied separately for Circuit-Switched Fallback (CSFB) services.

A network may utilize the Service-Specific Access Control (SSAC) mechanism to allow the network to control MMTEL_Voice and MMTEL_Video services. Similar parameters as for normal ACB are given to the UE, to be forwarded to the upper layers (i.e., an application layer). The upper layer controlling the applications then does not start the services if they fail the access control checking based on SSAC parameters.

SUMMARY

According to a first embodiment, a method configures a user equipment with at least one set of application groups and the user equipment receives at least one set of barring parameters from a network entity. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network. The user equipment determines whether an application bypasses the barring check associated with the corresponding and lower priority sets of barring parameters.

In the method of the first embodiment, the receiving may comprise receiving a first and second set of barring parameters from the network entity. The first and second set of barring parameters correspond to a first and second barring checks, applied in order. The first barring parameters allow at least one first application to bypass the first and second barring checks. The second barring parameters allow at least one second application to bypass the second barring check corresponding to the second barring parameters. The determining may include determining whether a third application not belonging to either of the application groups corresponding to barring parameter sets passes both the first barring check and the second barring check. The third application is allowed to access the network if it passes both the first barring check and the second barring check.

In the method of the first embodiment, the set of barring parameters may include notification of whether the set of barring parameters are applicable only for a certain UE or a group of UEs. Only the applicable UEs apply the barring checks corresponding to the barring parameter sets.

In the method of the first embodiment, the at least one first application corresponds to an application to be prioritized during an emergency situation. The at least one second application corresponds to an application to be prioritized during a non-emergency situation.

According to a second embodiment, an apparatus may include at least one processor. The apparatus may also include at least one memory including computer program code. The at least one memory and the computer program code may be configured, with the at least one processor, to cause the apparatus at least to receive at least one set of barring parameters from a network entity. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network. The apparatus determines whether an application bypasses the barring check associated with the corresponding and lower priority sets of barring parameters In the apparatus of the second embodiment, the receiving may include receiving a first and second set of barring parameters from the network entity. The first and second set of barring parameters correspond to a first and second barring checks, applied in order. The first barring parameters allow at least one first application to bypass the first and second barring checks. The second barring parameters allow at least one second application to bypass the second barring check corresponding to the second barring parameters. The determining may include determining whether a third application not belonging to either of the application groups corresponding to barring parameters sets passes both the first barring check and the second barring check. The third application is allowed to access the network if it passes both the first barring check and the second barring check.

In the apparatus of the second embodiment, the set of barring parameters may include notification of whether the set of barring parameters are applicable only for a certain UE or a group of UEs. Only the applicable UEs apply the barring checks corresponding to the barring parameters.

In the apparatus of the second embodiment, the at least one first application corresponds to an application to be prioritized during an emergency situation. The at least one second application corresponds to an application to be prioritized during a non-emergency situation.

According to a third embodiment, a computer program product may be embodied on a non-transitory computer readable medium. The computer program product may be configured to control a processor to perform a process including receiving, by a user equipment, at least one set of barring parameters from a network entity. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network. The process also includes determining whether an application bypasses the barring check associated with the corresponding and lower priority sets of barring parameters.

According to a fourth embodiment, a method may include determining, by a network node, a user equipment to transmit to. The method may also include transmitting, by the network node, at least one set of barring parameters to the user equipment. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network.

In the method of the fourth embodiment, the transmitting may include transmitting a first and second set of barring parameters to the user equipment. The first and second set of barring parameters correspond to a first and second barring checks, applied in order. The first barring parameters allow at least one first application to bypass the first and second barring checks. The second barring parameters allow at least one second application to bypass the second barring check corresponding to the second barring parameters. A third application, not belonging to either of the application groups corresponding to barring parameter sets, is allowed to access the network if it passes both the first barring check and the second barring check.

In the method of the fourth embodiment, the set of barring parameters may include notification of whether the set of barring parameters are applicable only for a certain UE or a group of UEs. The application UEs apply the barring checks corresponding to the barring parameter sets.

In the method of the fourth embodiment, the at least one first application corresponds to an application to be prioritized during an emergency situation. The at least one second application corresponds to an application to be prioritized during a non-emergency situation.

According to a fifth embodiment, an apparatus may include at least one processor. The apparatus may also include at least one memory including computer program code. The at least one memory and the computer program code may be configured, with the at least one processor, to cause the apparatus at least to determine a user equipment to transmit to. The apparatus may also be caused to transmit at least one set of barring parameters to the user equipment. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network.

In the apparatus of the fifth embodiment, the transmitting may comprise transmitting a first and second set of barring parameters to the user equipment. The first and second set of barring parameters correspond to a first and second barring checks, applied in order. The first barring parameters allow at least one first application to bypass the first and second barring checks. The second barring parameters allow at least one second application to bypass the second barring check corresponding to the second barring parameters. A third application, not belonging to either of the application groups corresponding to barring parameter sets, is allowed to access the network if it passes both the first barring check and the second barring check.

In the apparatus of the fifth embodiment, the set of barring parameters may include notification of whether the set of barring parameters are applicable only for a certain UE or a group of UEs. Only the application UEs apply the barring checks corresponding to the barring parameter sets.

In the apparatus of the fifth embodiment, the at least one first application corresponds to an application to be prioritized during an emergency situation. The at least one second application corresponds to an application to be prioritized during a non-emergency situation.

According to a sixth embodiment, a computer program product may be embodied on a non-transitory computer readable medium. The computer program product may be configured to control a processor to perform a process including determining, by a network node, a user equipment to transmit to. The process may also include transmitting, by the network node, at least one set of barring parameters to the user equipment. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network.

According to a seventh embodiment, a method configures a user equipment with at least one set of application groups. Each group has a unique priority, and an application belonging to a higher priority group also belongs to all lower priority groups. The user equipment receives at least one set of barring parameters from a network entity. Each set of barring parameters corresponds to a need to pass a barring check and to at least one application that is allowed to bypass the barring check associated with the corresponding barring parameters. Hence, an application needs to pass or bypass all the barring checks according to the received parameters to access the network for the application In the method of the seventh embodiment, the set of barring parameters may include notification of whether the set of barring parameters are applicable only for a certain UE or a group of UEs. Only the applicable UEs apply the barring checks corresponding to the barring parameter sets.

In the method of the seventh embodiment, at least one first application corresponds to an application to be prioritized during an emergency situation. At least one second application corresponds to an application to be prioritized during a non-emergency situation.

According to an eighth embodiment, a system may include a first apparatus. The first apparatus may include receiving means for receiving at least one set of barring parameters from a network entity. Each set may correspond to a barring check and have a unique implicit or explicit priority. Each set of received barring parameters may also correspond to at least one application that is allowed to bypass the barring check associated with the corresponding and lower priority sets of barring parameters. An application belonging to one of the application groups corresponding to a set of barring parameters may need to pass all the barring checks according to the higher priority barring parameters to access the network. The first apparatus may also include first determining means for determining whether an application bypasses the barring check associated with the corresponding and lower priority sets of barring parameters. The system may also include a second apparatus. The second apparatus may include second determining means for determining to transmit to the first apparatus. The second apparatus may also include transmitting means for transmitting the at least one set of barring parameters to the first apparatus.

BRIEF DESCRIPTION OF THE DRAWINGS

For proper understanding of the invention, reference should be made to the accompanying drawings, wherein:

FIG. 1 illustrates a user equipment using barring parameters in accordance with one embodiment.

FIG. 2 illustrates contents of a System Information Block 2 in accordance with one embodiment.

FIG. 3 illustrates contents of a System Information Block 2 in accordance with another embodiment.

FIG. 4 illustrates a flowchart of a method in accordance with embodiments of the invention.

FIG. 5 illustrates a flowchart of a method in accordance with embodiments of the invention.

DETAILED DESCRIPTION

Figure 6:
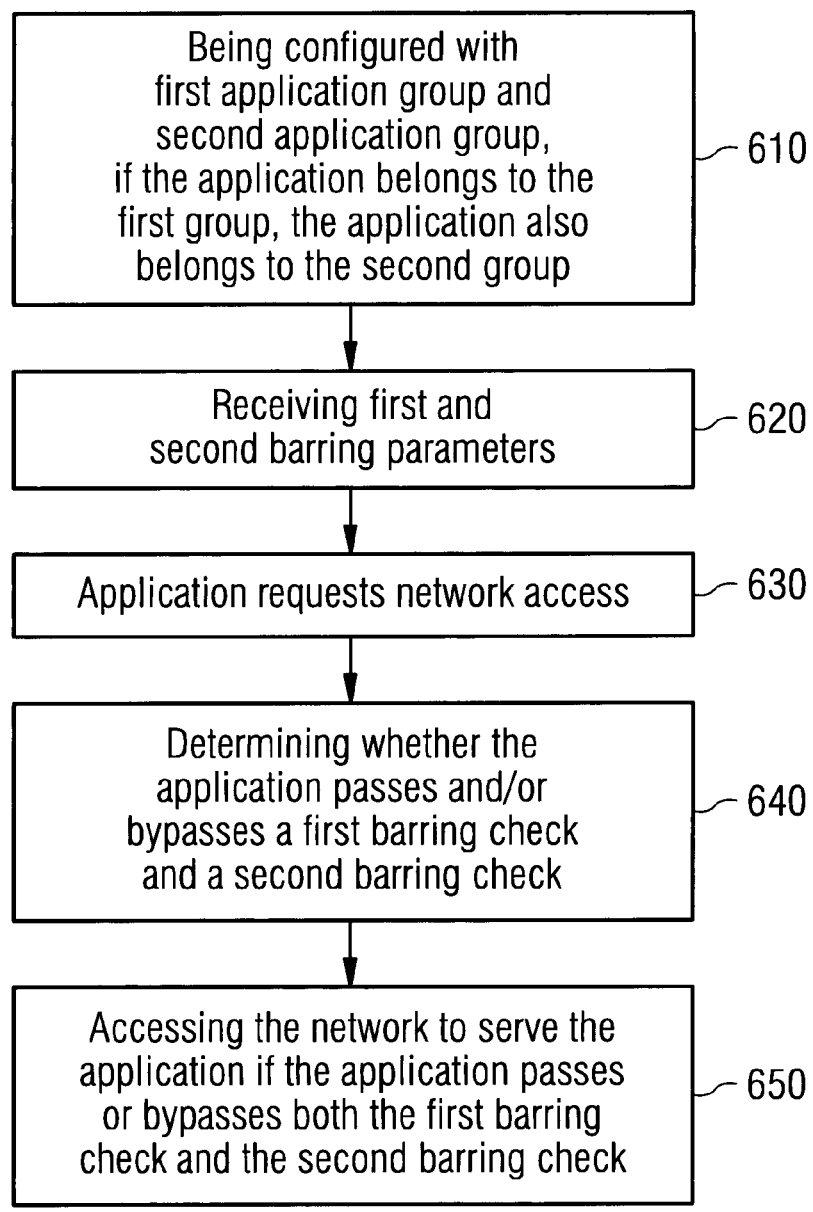
FIG. 6 illustrates a flowchart of a method in accordance with embodiments of the invention.

Embodiments of the present invention relate to a method and apparatus for performing congestion mitigation and/or service-specific barring. In embodiments of the present invention, a network may signal multiple barring parameters. In one embodiment, an eNB/base-station may transmit barring parameters to a user equipment (UE). Embodiments of the present invention may determine how the UE responds when certain specific parameters are received.

When user-generated and/or application-generated accesses are concentrated during a certain time, the accesses may cause congestion in a Radio-Access Network (RAN) and a core network (CN). When congestion occurs, a telecommunication operator generally wants to prioritize emergency access and high priority access over other accesses to prioritize Radio-Resource-Control/Non-Access-Stratum (RRC/NAS) messages over normal data, and/or to prioritize voice services over non-voice services. The implementation of prioritization control may depend on the operator's specific policies.

3GPP has agreed upon a work item (described in WID RP-132092) called Smart Congestion Mitigation (SCM). This work item determines a method of prioritizing Multimedia-Telephony-Voice (MMTEL-Voice) service. With this WID, many solutions are proposed and captured in TR 36.848. (RP-131661).

However, before any RAN plenary meeting agreed on SCM work, the SA1 service group discussed a work item for Application-specific Congestion Control for Data Connectivity (ACDC) Work Item to perform access control for each application. However, further progress was postponed to 3GPP Release 13 or later. The details of ACDC work are captured in TR 22.806.

Because SCM relates to MMTEL-Voice prioritization, while ACDC is directed to prioritizing selected applications in general, SCM is generally considered to be a subset of ACDC. Therefore, instead of finding a SCM-specific method of prioritization as in TR 36.848, it may be desirable to determine a method of prioritization that is more general so that the method may be used for ACDC in general.

As described above, methods for prioritization, as described within TR 36.848, are specifically applicable to MMTEL-Voice services. Therefore, the methods for prioritizing described within TR 36.848 lack forward compatibility if/when ACDC is to be supported in the future. In the future, the signalling may be performed via Radio-Resource-Control (RRC).

Embodiments of the present invention provide a method for smart-congestion mitigation and barring in congestion cases. For example, embodiments of the present invention may reduce connection requests from UEs in IDLE mode, thus saving Random-Access-Channel (RACH) resources. Embodiments of the present invention may be directed to new barring parameters for different application groups, and embodiments of the present invention may provide specific rules on how to create the enabled services, how to broadcast the barring parameters, and how a UE applies those barring parameters when the connection request from IDLE mode should be reduced, for example, in congestion cases.

Embodiments of the present invention allow a network, when a connection request from an IDLE mode should be reduced, to control which applications may even try to start by applying barring parameter in sequence. Applying such access control in sequence is easier to implement than applying access control per each application in LTE.

Applying such access control in sequence is easier because the type of the application is known in the application layer and, except for Service-Specific-Access-Control (SSAC), the barring parameters are handled in a modem. The modem and application layer are individual modules. Therefore, by using ordered lists, embodiments of the present invention allow for more control over which applications are prioritized, and embodiments of the present invention do not require complex interaction between AS/NAS/Application layers. Relaying the parameters from AS to application layer may be performed in the same way as is done for SSAC. Embodiments of the present invention are directed to rules, which govern, in a congestion situation, how the barring parameters are applied, and how they interwork with the existing barring mechanisms. In addition, for RRC_CO- NNECTED UEs, the network may also specifically determine some UEs which should or should not utilize the indications, which may cater to different user profiles.

In one embodiment, an evolved Node B (eNB) may transmit/broadcast barring parameters relating to one or more application groups. Each application group may include one or more application. The barring parameters may be applied in the order that they are signalled by the eNB. The barring parameters may indicate which application require an access-barring check. The eNB may also indicate whether the barring of certain application groups is currently active.

The amount of application groups and the manner of mapping application groups to the barring parameters may be defined in an application layer and/or an operating-system (OS) layer. The barring parameters may be mapped to the application groups in the Radio-Resource Control (RRC) layer. The amount of groups and the manner of mapping the barring parameters to the application groups in the RRC layer may also be defined in the adaptation layer between a modem and an operating system (OS).

According to embodiments of the present invention, 3GPP may define a plurality of application groups for which the barring parameters are applicable. For example, a first group (hereinafter referred to as "group 1") may correspond to a group of applications to be prioritized during an emergency situation. A second group (hereinafter referred to as "group 2") may correspond to a group of applications to be prioritized during a non-emergency situation (such as a social event, for example). RRC signalling may then be used to broadcast the barring parameters corresponding to each of the groups.

FIG. 1 illustrates a UE using barring parameters in accordance with one embodiment. Referring to FIG. 1, a UE 100 may receive the barring parameters for group 1 from a network. The UE 100 may then forward these received barring parameters to an application (AP) layer. The barring parameters may be forwarded to the AP layer in the same manner as how Service-Specific-Access-Control (SSAC) parameters are forwarded from the AS to the Non-access Stratum (NAS) to the AP layer. In the AP layer, only applications belonging to group 1 may bypass the barring parameters, and the other applications which do not belong to group 1 should be subjected to a barring check in accordance with the barring parameters. If an application is barred after the barring check, the UE cannot initiate that barred application (like with any other barring mechanism). Otherwise, the UE may continue to make the connection to use that application. In another embodiment, a network may broadcast barring parameters for group 1 and group 2. When a UE receives the broadcast barring parameters, the UE may forward the barring parameters to an application layer and then apply the barring parameters for both group 1 and group 2 applications. Embodiments of the present invention also define the interaction among the barring parameters for group 1 and group 2. In one embodiment, group 1 may be defined as having priority over group 2. For example, applications corresponding to group 1 may be considered to be more important than the applications of other groups, and group 2 may correspond to applications which operators want to prioritize if a network is congested due to the heavy-traffic load (for example, heavy traffic during social events).

Embodiments of the present invention may direct the interaction between the barring parameters for group 1 and group 2.

In one embodiment, an eNB may be allowed to only broadcast barring parameters for a single application group. For example, if there are two application groups, the eNB may broadcast only barring parameters for group 1 or for group 2, but not for both groups.

In another embodiment, the eNB may be allowed to broadcast parameters for multiple groups. The order in which the eNB broadcasts the parameters may signify how the parameters are to be applied. For example, the order in which the parameters are broadcasted may determine the priority of the parameters. For example, if the parameters of group 1 are broadcasted first by the eNB, the applications of group 1 may be more important than the applications of group 2. The importance of the applications in a group may decrease as the numerical order of the corresponding transmitted parameter-group increases. The UE may first apply the first priority barring parameter before considering a lower-priority barring parameter.

To further illustrate embodiments of the present invention, consider the following example cases. In a first example case, suppose an application belongs to group 2 but the application does not belong to group 1. When the application causes the UE to attempt to access the network, the UE first checks the application against barring according to the parameters for group 1, and, if the application does not pass the barring check based on group 1 parameters, the UE cannot make the connection for a certain duration. If the UE passes the previous first barring check, the UE then checks the group 2 access parameters. If the application belongs to group 2, the UE is allowed to bypass the barring parameters of group 2 and is then allowed to start to access the network for this application.

In a second example case, suppose an application belongs to neither group 1 nor group 2. In this case, both barring checks are applied. First, the UE checks whether the application is barred according to group 1 parameters and then checks barring based on group 2 parameters. If the UE passes both barring checks with both barring parameters, the UE is then allowed to try to start to access the network for this application.

In a third example case, suppose an application belongs to group 1. In this case, barring parameters for group 1 and group 2 are both ignored, and the UE is allowed to access the network for this application. The group 2 conditions need not be checked because group 1 already allows the application.

In a fourth example case, suppose an application belongs to both group 1 and group 2. In this case, the parameters indicating access checks for both groups are both ignored, and the UE is allowed to access the network for this application.

In another embodiment, the eNB may transmit the barring parameters in a dedicated manner. For example, the eNB may transmit barring parameters applicable only for certain UEs in RRC_CONNECTED mode. This embodiment may allow more detailed tuning of which UEs are included or excluded, in order to prevent unauthorized UEs from accessing the network.

In embodiments of the present invention, the barring parameters may be applied to the application groups, in accordance with normal Access Class Barring (ACB) methods that have already been specified. For example, the new barring parameters are generally applicable to AC 0-9.

Embodiments of the present invention may be applied over a variety of barring parameters. For example, if a network broadcasts barring parameters for group 1 and broadcasts SSAC barring parameters for MMTEL-Voice (which does not belong to group 1), and the UE attempts to use MMTEL-Voice, the UE first applies the barring check for group 1. If the UE passes the barring check for group 1, the UE then applies the barring parameters for MMTEL-Voice.

In one example, if MMTEL-Voice service belongs to group 1, and a UE receives barring parameters for group 1 and SSAC for MMTEL-Voice, the UE will bypass the barring check for group 1 but will apply the barring parameters for MMTEL-Voice in SSAC. FIG. 2 illustrates a System Information Block 2 in accordance with one embodiment. One possible implementation of multiple groups of parameters is to have two barring groups and the necessary parameters in the System Information Block 2 (SIB2) as shown in FIG. 2.

FIG. 3 illustrates another System Information Block 2 in accordance with another embodiment. Another possible implementation of a single group of parameters is to have two barring groups and the necessary parameters in a CHOICE Structure of the SIB2 so that the network cannot signal barring parameters for both groups.

Embodiments of the present invention may use simpler logic in the UE because the UE just needs to apply the barring check sequentially. Embodiments of the present invention may apply a solution which is forward compatible. Embodiments of the present invention may operate without interaction between an Application layer and an AS layer. In embodiments of the present invention, an AS layer need not be service-specific. In embodiments of the present invention, as the grouping of the application may be configured by an operator in the application layer, embodiments of the present invention may be very flexible.

FIG. 4 illustrates a flowchart of a method in accordance with embodiments of the invention. The method illustrated in FIG. 4 includes, at 410, receiving, by a user equipment, at least one set of barring parameters from a network entity. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network. The method also includes, at 420, determining whether an application bypasses the barring check associated with the corresponding and lower priority sets of barring parameters.

FIG. 5 illustrates a flowchart of a method in accordance with embodiments of the invention. The method illustrated in FIG. 5 includes, at 510, determining, by a network node, a user equipment to transmit to. The method also includes, at 520, transmitting, by the network node, at least one set of barring parameters to the user equipment. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network.

FIG. 6 illustrates a flowchart of a method in accordance with embodiments of the invention. At 610, a user equipment can be configured with a first application group and a second application group and if an application belongs to the first group, the application also belongs to the second group. At 620, the method includes receiving first and second barring parameters. At 630, the application requests network access. At 640, the method includes determining whether the application passes and/or bypasses a first barring check and a second barring check. At 650, the method includes accessing the network to serve the application if the application passes or bypasses both the first barring check and the second barring check.

Figure 7:
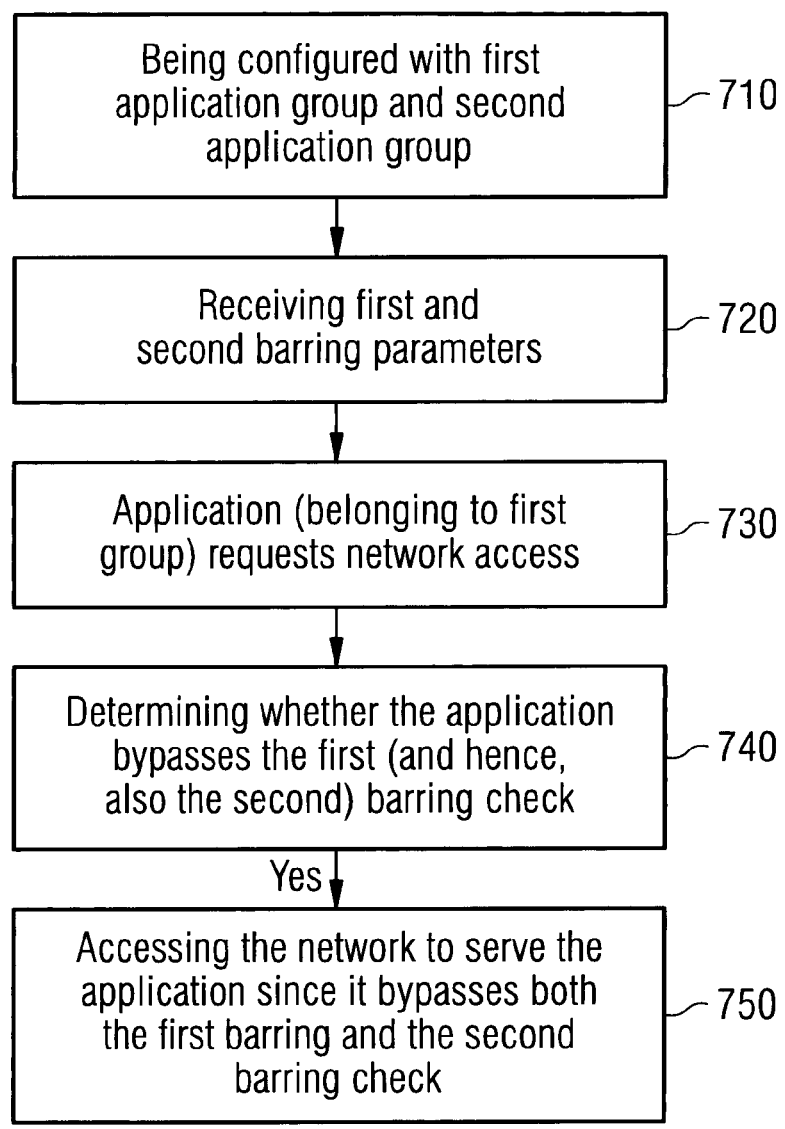
FIG. 7 illustrates a flowchart of a method in accordance with embodiments of the invention.

FIG. 7 illustrates a flowchart of a method in accordance with embodiments of the invention. At 710, a user equipment can be configured with a first application group and a second application group. At 720, the method can include receiving first and second barring parameters. At 730, an application requests network access. At 740, the method includes determining whether the application bypasses the first barring check. If the application bypasses the first barring check, at 750, the method can include accessing the network to serve the application since it bypasses both the first barring and the second barring check.

Figure 8:
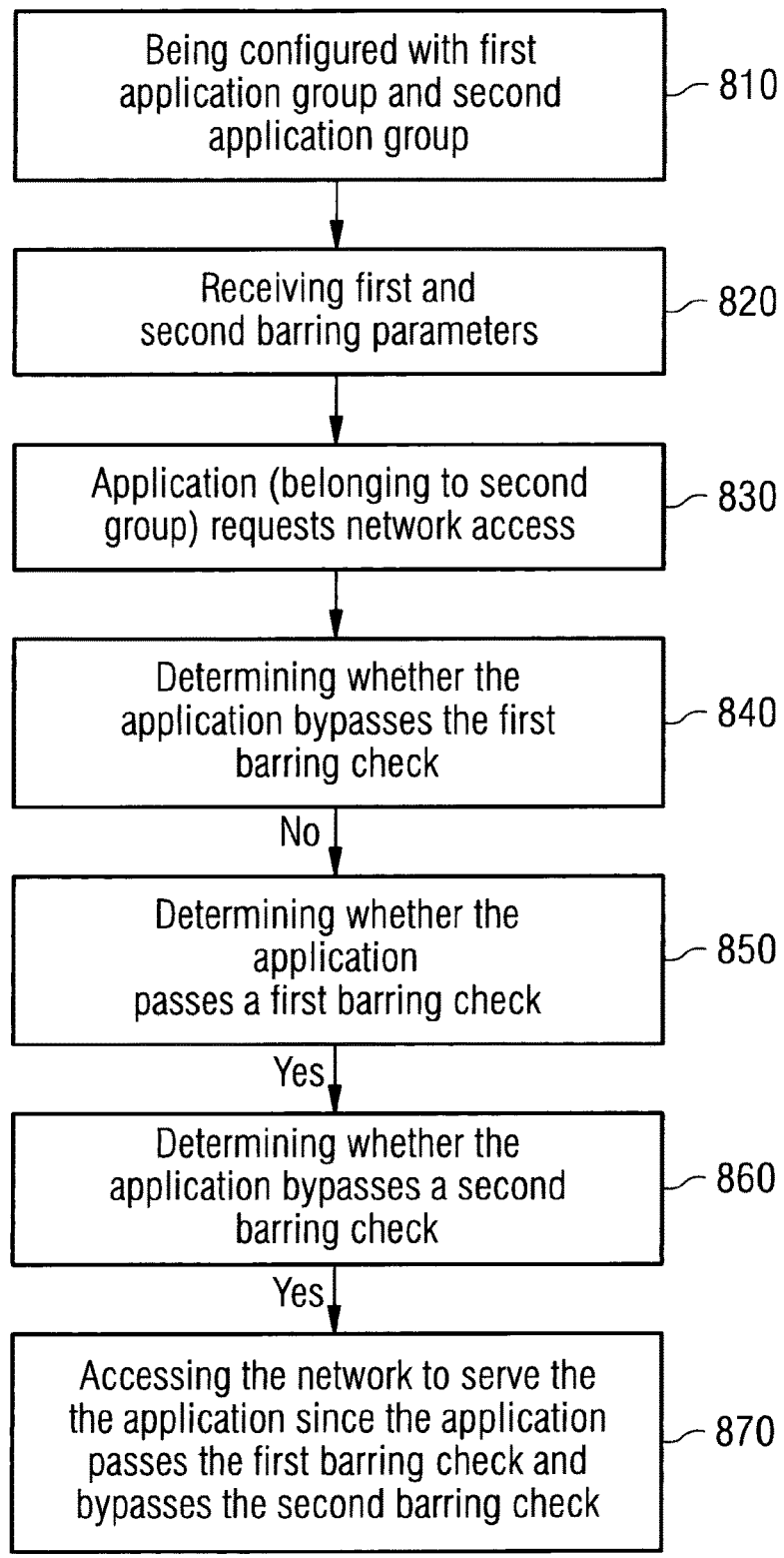
FIG. 8 illustrates a flowchart of a method in accordance with embodiments of the invention.

FIG. 8 illustrates a flowchart of a method in accordance with embodiments of the invention. At 810, a user equipment can be configured with a first application group and a second application group. At 820, the method can also include receiving first and second barring parameters. At 830, the application requests network access. At 840, the method can also include determining whether the application bypasses the first barring check. If the application does not bypass the first barring check, at 850, the method can also include determining whether the application passes a first barring check. If the application passes the first barring check, at 860, the method can also include determining whether the application bypasses a second barring check. If the application bypasses the second barring check, at 870, the method includes accessing the network to serve the application since the application passes the first barring check and bypasses the second barring check.

Figure 9:
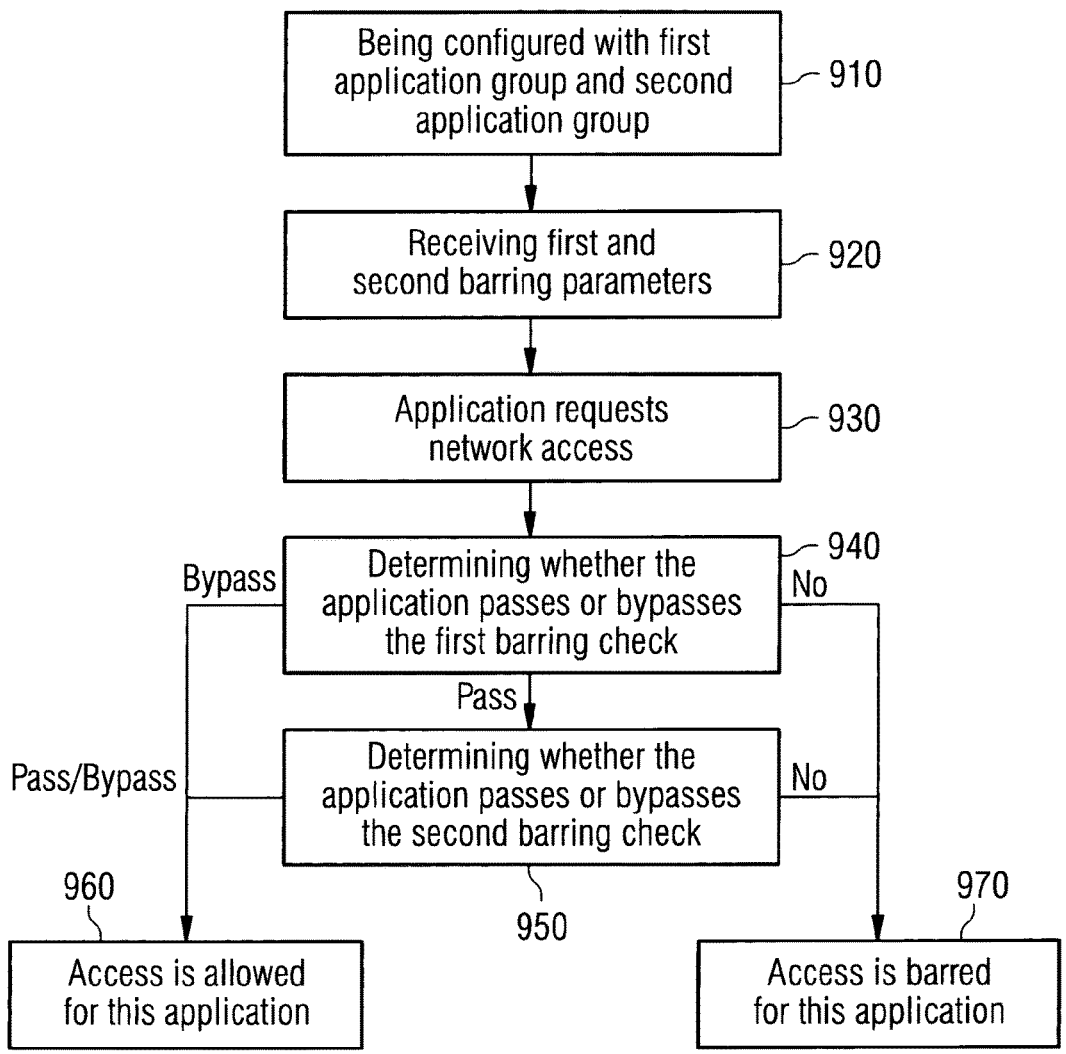
FIG. 9 illustrates a flowchart of a method in accordance with embodiments of the invention.

FIG. 9 illustrates a flowchart of a method in accordance with embodiments of the invention. At 910, a user equipment can be configured with a first application group and a second application group. At 920, the method can include receiving first and second baring parameters. At 930, the application can request network access. At 940, the method can include determining whether the application passes or bypasses the first barring check. If the application bypasses the first barring check, at 960, access is allowed for this application. If the application does not bypass and does not pass the first barring check, at 970, access is barred for this application. If the application does not bypass the first barring check but passes the first barring check, at 950, the method includes determining whether the application passes or bypasses the second barring check. If the application bypasses the second barring check, at 960, access is allowed for this application. If the application does not bypass and does not pass the second barring check, at 970, access is barred for this application. If the application does not bypass the second barring check but passes the second barring check, at 960, access is allowed for this application.

Figure 10:
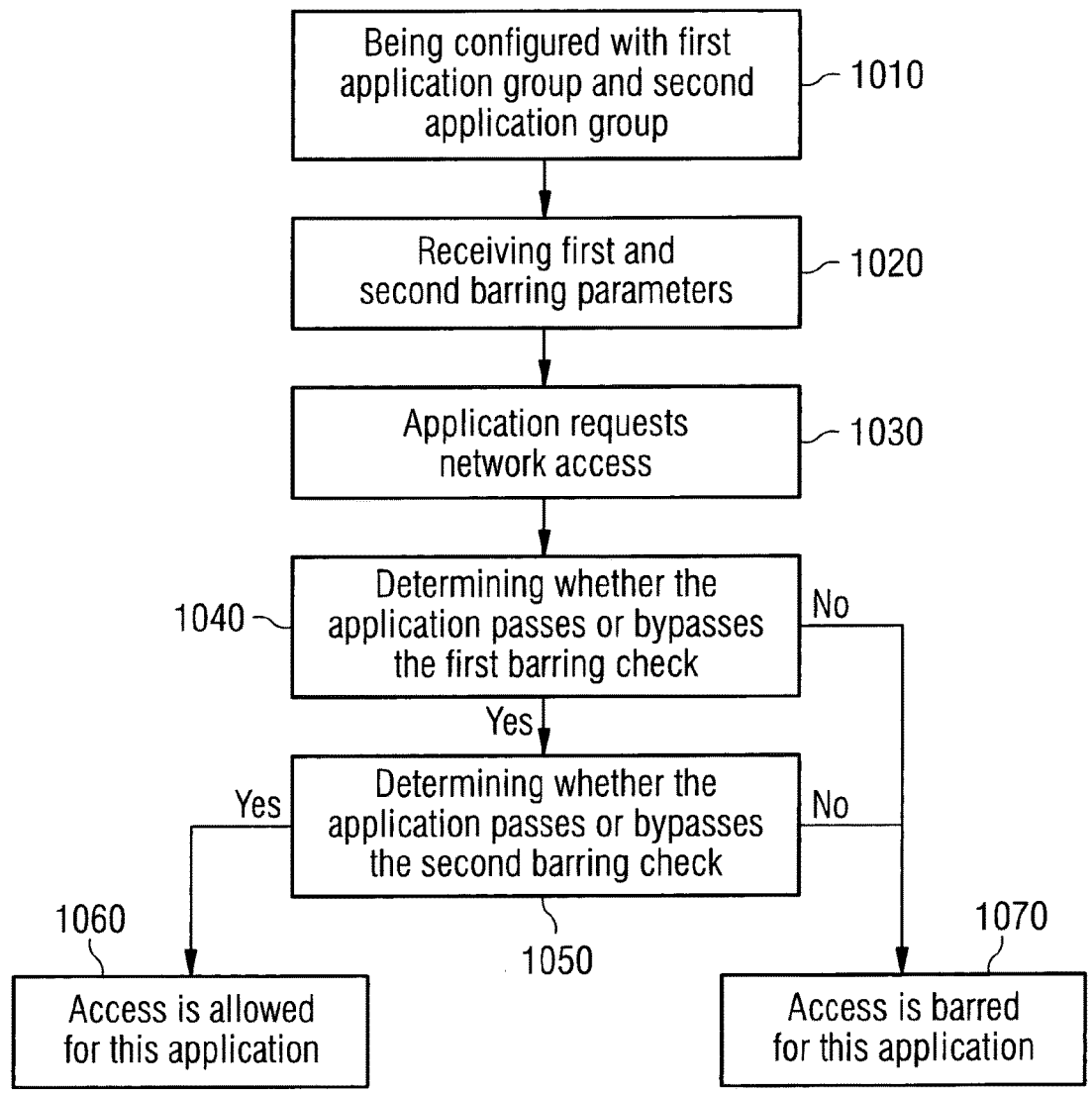
FIG. 10 illustrates a flowchart of a method in accordance with embodiments of the invention.

FIG. 10 illustrates a flowchart of a method in accordance with embodiments of the invention. At 1010, a user equipment can be configured with a first application group and a second application group. At 1020, the method can include receiving first and second barring parameters. At 1030, the application can request network access. At 1040, the method can include determining whether the application passes or bypasses the first barring check. If the application neither passes nor bypasses the first barring check, at 1070, access is barred for this application. If the application passes or bypasses the first barring check, at 1040, the method includes determining whether the application passes or bypasses the second barring check. If the application passes or bypasses the second barring check, at 1060, access is allowed for this application. If the application does not pass nor bypass the second barring check, at 1070, access is barred for this application.

Figure 11:
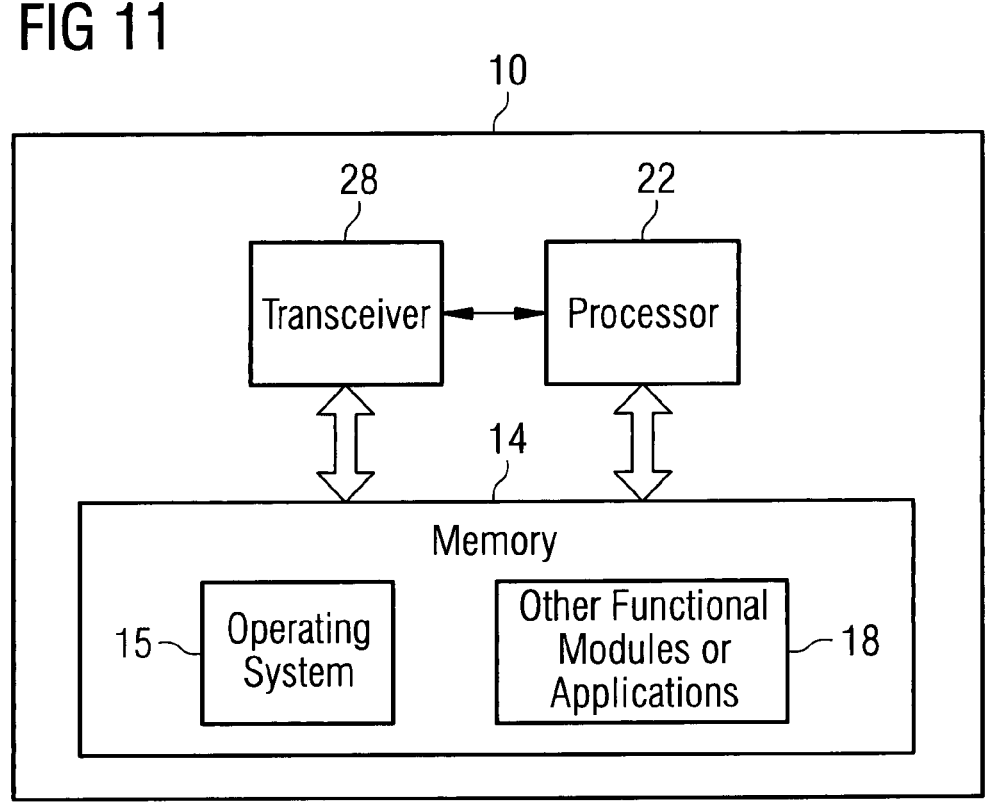
FIG. 11 illustrates an apparatus in accordance with embodiments of the invention.

FIG. 11 illustrates an apparatus in accordance with embodiments of the invention. In one embodiment, the apparatus may be a user equipment. In another embodiment, the apparatus may be a base station and/or an evolved Node B. Apparatus 10 may include a processor 22 for processing information and executing instructions or operations. Processor 22 may be any type of general or specific purpose processor. While a single processor 22 is shown in FIG. 11, multiple processors may be utilized according to other embodiments. Processor 22 may also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

Figure 12:
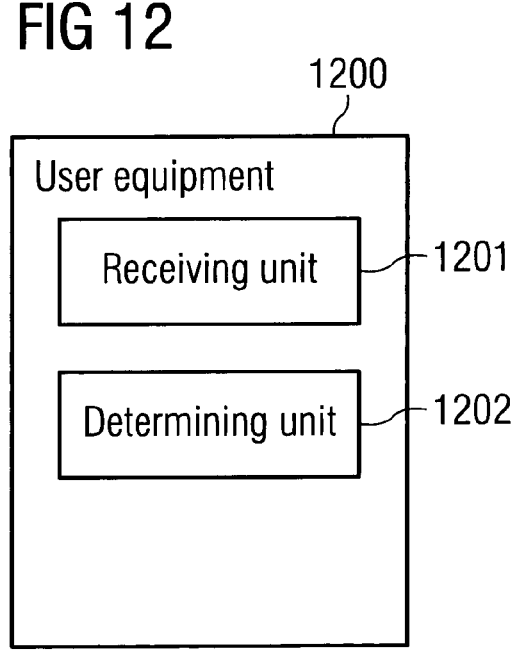
FIG. 12 illustrates an apparatus in accordance with embodiments of the invention.

FIG. 12 illustrates an apparatus in accordance with embodiments of the invention. Apparatus 1200 may be a user equipment, for example. Apparatus 1200 may include a receiving unit 1201 that receives at least one set of barring parameters from a network entity. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network. Apparatus 1200 also includes a determining unit 1202 that determines whether an application bypasses the barring check associated with the corresponding and lower priority sets of barring parameters.

Figure 13:
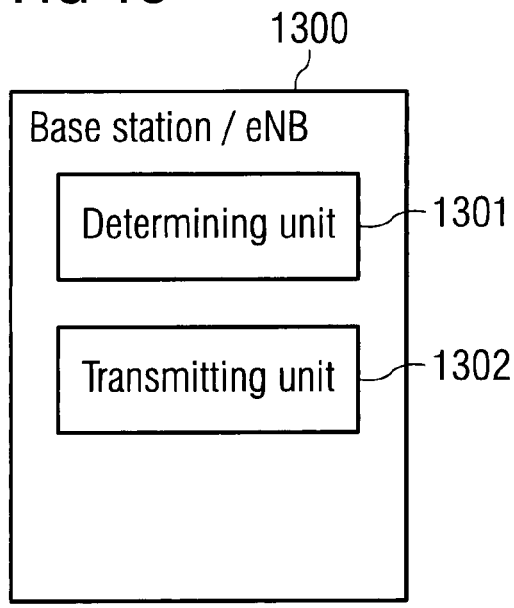
FIG. 13 illustrates an apparatus in accordance with embodiments of the invention.

FIG. 13 illustrates an apparatus in accordance with embodiments of the invention. Apparatus 1300 may be a base station and/or evolved Node B, for example. Apparatus 1300 may include a determining unit 1301 that determines a user equipment to transmit to. Apparatus 1300 may also include a transmitting unit 1302 that transmits at least one set of barring parameters to the user equipment. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network.

Figure 14:
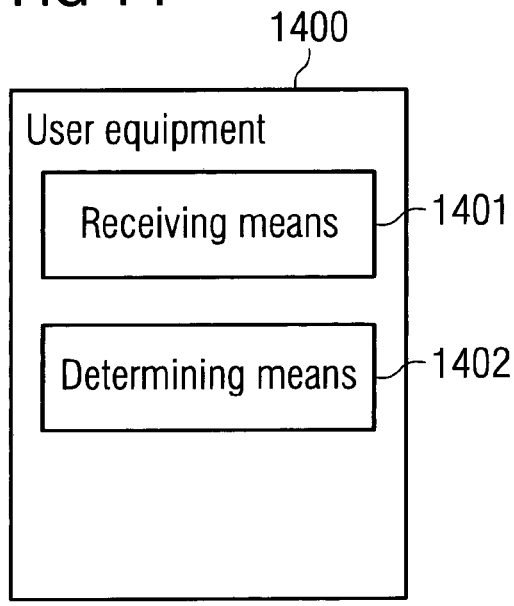
FIG. 14 illustrates an apparatus in accordance with embodiments of the invention.

FIG. 14 illustrates an apparatus in accordance with embodiments of the invention. Apparatus 1400 may be a user equipment, for example. Apparatus 1400 may include a receiving means 1401 that receives at least one set of barring parameters from a network entity. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network. Apparatus 1400 also includes a determining means 1402 that determines whether an application bypasses the barring check associated with the corresponding and lower priority sets of barring parameters.

Figure 15:
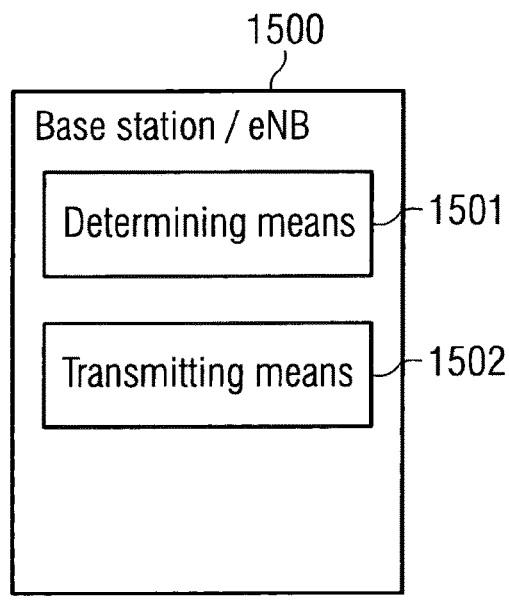
FIG. 15 illustrates an apparatus in accordance with embodiments of the invention.

FIG. 15 illustrates an apparatus in accordance with embodiments of the invention. Apparatus 1500 may be a base station and/or evolved Node B, for example. Apparatus 1500 may include a determining means 1501 that determines a user equipment to transmit to. Apparatus 1500 may also include a transmitting means 1502 that transmits at least one set of barring parameters to the user equipment. Each set corresponds to a barring check and has a unique implicit or explicit priority. Each set of received barring parameters also corresponds to at least one application that is allowed to bypass the barring check associated with the corresponding and lower priority sets of barring parameters. An application belonging to one of the application groups corresponding to a set of barring parameters needs to pass all the barring checks according to the higher priority barring parameters to access the network.

Figure 16:
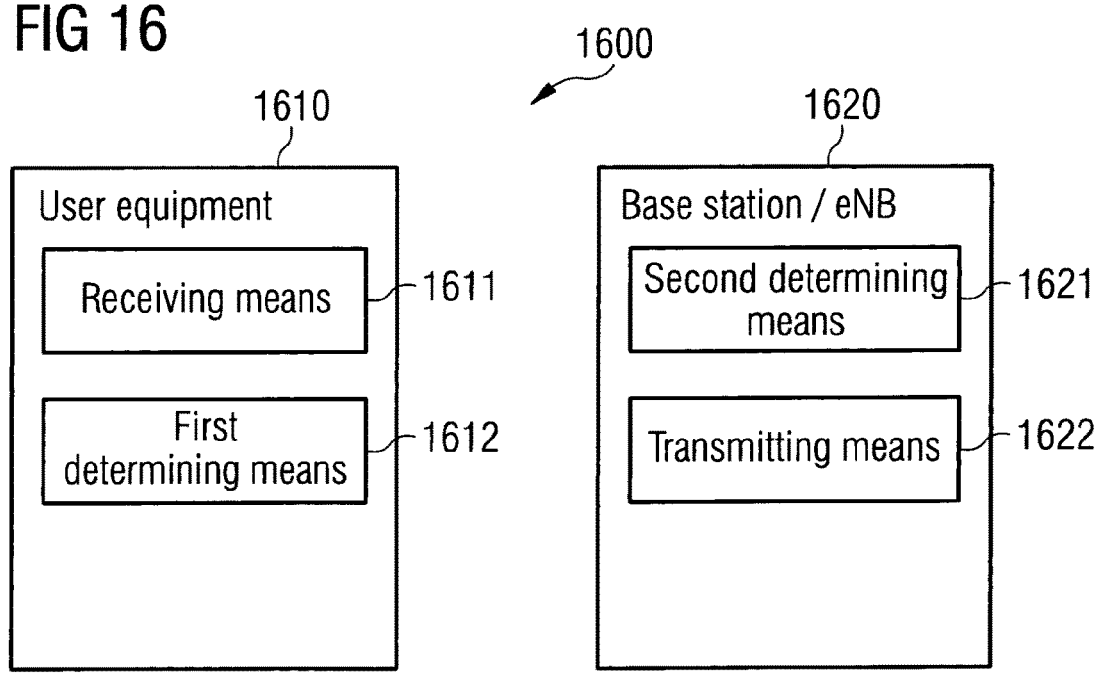
FIG. 16 illustrates a system in accordance with embodiments of the invention.

FIG. 16 illustrates a system in accordance with embodiments of the invention. System 1600 may include a first apparatus 1610. First apparatus 1610 may include receiving means 1611 for receiving at least one set of barring parameters from a network entity. Each set may correspond to a barring check and has a unique implicit or explicit priority. Each set of received barring parameters may also correspond to at least one application that is allowed to bypass the barring check associated with the corresponding and lower priority sets of barring parameters. An application belonging to one of the application groups corresponding to a set of barring parameters may need to pass all the barring checks according to the higher priority barring parameters to access the network. First apparatus 1610 may also include first determining means 1612 for determining whether an application bypasses the barring check associated with the corresponding and lower priority sets of barring parameters. System 1600 may also include a second apparatus 1620. Second apparatus 1620 may include a second determining means 1621 for determining to transmit to the first apparatus 1610. Second apparatus 1620 may also include transmitting means 1622 for transmitting the at least one set of barring parameters to the first apparatus 1610.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
receiving, by a user equipment, a plurality of barring parameter sets from an entity of a network, wherein each set defines a barring check and has a different unique implicit or explicit priority, wherein the receiving comprises receiving a first and second set of barring parameters from the entity of the network, wherein the first and second set of barring parameters correspond to a first and second barring checks, applied in order, the first set of barring parameters allows at least one first application to bypass the first and second barring checks, the second set of barring parameters allows at least one second application to bypass the second barring check corresponding to the second set of barring parameters; and
determining whether an application belonging to an application group is allowed to access the network based on a plurality of the priorities of the sets of barring parameters and a priority of the application group, wherein the determining comprises determining one of:
that a third application not belonging to application groups corresponding to the first and second sets of barring parameters is required to pass both the first barring check and the second barring check before being allowed to access the network,
that a third application belonging to both application groups corresponding to the first and second sets of barring parameters is allowed to bypass both the first barring check and the second barring check, or
that a third application belonging to the second application group but not to the first application group, corresponding to the second and first sets of barring parameters respectively, is required to pass the first barring check before being allowed to access the network, and that the third application is allowed to bypass the second barring check.

2. The method according to claim 1, wherein for accessing the network:
the application is allowed to bypass the barring check of each set having a corresponding or lower priority than the priority of the application group, and
the application needs to pass all the barring checks of each set having a higher priority than the priority of the application group.

3. The method according to claim 1, wherein at least one set of barring parameters of the barring parameter sets comprises a notification of whether the set of barring parameters are applicable only for a certain user equipment or a group of user equipments, and wherein the user equipment applies the barring checks corresponding to the set of barring parameter if applicable to the user equipment according to the notification.

4. The method according to claim 1, wherein the application group corresponds to a group of applications to be prioritized during an emergency situation, or to a group of applications to be prioritized during a non-emergency situation.

5. The method of claim 1, wherein the user equipment is configured with at least one set of application groups, wherein each application group has a unique priority, an application belonging to an application group having a certain unique priority also belonging to all application groups having a lower priority.

6. An apparatus, comprising at least one processor and at least one memory including a computer program code, wherein the at least one memory and the computer pro-gram code are configured, with the at least one processor, to cause the apparatus to perform operations comprising:
receiving a plurality of barring parameter sets from an entity of a network, wherein each set defines a barring check and has a different unique implicit or explicit priority, wherein the receiving comprises receiving a first and second set of barring parameters from the entity of the network, wherein the first and second set of barring parameters correspond to a first and second barring checks, applied in order, the first set of barring parameters allows at least one first application to bypass the first and second barring checks, the second set of barring parameters allows at least one second application to bypass the second barring check corresponding to the second set of barring parameters; and
determining whether an application belonging to an application group is allowed to access the network based on a plurality of the priorities of the sets of barring parameters and a priority of the application group, wherein the determining comprises determining one of:
that a third application not belonging to application groups corresponding to the first and second sets of barring parameters is required to pass both the first barring check and the second barring check before being allowed to access the network,
that a third application belonging to both application groups corresponding to the first and second sets of barring parameters is allowed to bypass both the first barring check and the second barring check, or that a third application belonging to the second application group but not to the first application group, corresponding to the second and first sets of barring parameters respectively, is required to pass the first barring check before being allowed to access the network, and that the third application is allowed to bypass the second barring check.

7. The apparatus according to claim 6, wherein for accessing the network:

the application is allowed to bypass the barring check of each set having a corresponding or lower priority than the priority of the application group, and the application needs to pass all the barring checks of each set having a higher priority than the priority of the application group.

8. The apparatus according to claim 6, wherein at least one set of barring parameters of the barring parameter sets comprises a notification of whether the set of barring parameters are applicable only for a certain user equipment or a group of user equipments, and wherein the apparatus applies the barring checks corresponding to the set of barring parameters if applicable to the apparatus according to the notification.

9. The apparatus according to claim 6, wherein the application group corresponds to a group of applications to be prioritized during an emergency situation, or to a group of applications to be prioritized during a non-emergency situation.

10. The apparatus of claim 6, wherein the apparatus is configured with at least one set of application groups, wherein each application group has a unique priority, an application belonging to an application group having a certain unique priority also belonging to all application groups having a lower priority.

11. A method, comprising:

determining, by a network node of a network, a user equipment to transmit to; and transmitting, by the network node, a plurality of sets of barring parameters to the user equipment, wherein each set defines a barring check and has a different unique implicit or explicit priority, wherein the transmitting comprises transmitting a first and second set of barring parameters to the user equipment, wherein the first and second set of barring parameters correspond to a first and second barring checks, to be applied in order, the first set of barring parameters allows at least one first application to bypass the first and second barring checks, the second set of barring parameters allows at least one second application to bypass the second barring check corresponding to the second set of barring parameters, and wherein the transmitted sets of barring parameters are configured for determining whether an application belonging to an application group is allowed to access the network based on a plurality of the priorities of the sets of barring parameters and a priority of the application group, wherein the determining comprises determining one of:

that a third application not belonging to application groups corresponding to the first and second sets of barring parameters is required to pass both the first barring check and the second barring check before being allowed to access the network, that a third application belonging to both application groups corresponding to the first and second sets of barring parameters is allowed to bypass both the first barring check and the second barring check, or that a third application belonging to the second application group but not to the first application group, corresponding to the second and first sets of barring parameters respectively, is required to pass the first barring check before being allowed to access the network, and that the third application is allowed to bypass the second barring check.

12. The method according to claim 11, wherein for accessing the network:

the application is allowed to bypass the barring check of each set having a corresponding or lower priority than the priority of the application group, and the application needs to pass all the barring checks of each set having a higher priority than the priority of the application group.

13. The method according to claim 11, wherein at least one set of barring parameters of the barring parameter sets comprises a notification of whether the set of barring parameters are applicable only for a certain user equipment or a group of user equipments, the notification configuring a user equipment to apply the barring checks corresponding to the set of barring parameters if applicable to the user equipment according to the notification.

14. The method according to claim 11, wherein the application group corresponds to a group of applications to be prioritized during an emergency situation, or to a group of applications to be prioritized during a non-emergency situation.

15. The method of claim 11, further comprising:

configuring a user equipment with at least one set of application groups, wherein each application group has a unique priority, an application belonging to an application group having a certain unique priority also belonging to all application groups having a lower priority.

* * * * *